United States Patent
Campolieta et al.

(10) Patent No.: US 11,317,721 B2
(45) Date of Patent: May 3, 2022

(54) CUSHION WITH A NON-SKID FABRIC BORDER

(71) Applicant: L&P Property Management Company, South Gate, CA (US)

(72) Inventors: Daniel L. Campolieta, Hickory, NC (US); Gregory L. Van Dyke, Jamestown, NC (US)

(73) Assignee: L&P Property Management Company, South Gate, CA (US)

( * ) Notice: Subject to any disclaimer, the term of this patent is extended or adjusted under 35 U.S.C. 154(b) by 273 days.

(21) Appl. No.: 16/818,031

(22) Filed: Mar. 13, 2020

(65) Prior Publication Data
US 2021/0282558 A1    Sep. 16, 2021

(51) Int. Cl.
| | |
|---|---|
| *A47C 7/18* | (2006.01) |
| *B29D 99/00* | (2010.01) |
| *A47C 31/11* | (2006.01) |
| *B29L 31/00* | (2006.01) |
| *B29L 31/58* | (2006.01) |

(52) U.S. Cl.
CPC ............. *A47C 7/18* (2013.01); *A47C 31/11* (2013.01); *B29D 99/0092* (2013.01); *B29L 2031/58* (2013.01); *B29L 2031/751* (2013.01)

(58) Field of Classification Search
CPC .......... A47C 7/18; A47C 31/11; A47C 31/10; A47C 31/116; B29D 99/0092; B29L 2031/58; B29L 2031/751
USPC ...................................... 297/452.17
See application file for complete search history.

(56) References Cited

U.S. PATENT DOCUMENTS

| | | | |
|---|---|---|---|
| 2003/0205920 A1* | 11/2003 | Sprouse, II | A47C 7/021 297/219.1 |
| 2009/0205134 A1* | 8/2009 | Wootten, Jr. | A47G 9/04 5/488 |
| 2016/0073798 A1* | 3/2016 | Pawlikowski | A47C 31/11 5/497 |
| 2017/0224118 A1* | 8/2017 | Fernandez | A47C 7/021 |
| 2018/0242754 A1* | 8/2018 | Tillner | A47C 27/065 |
| 2021/0120967 A1* | 4/2021 | Murphy | A47C 31/001 |

* cited by examiner

*Primary Examiner* — Mark R Wendell
(74) *Attorney, Agent, or Firm* — Wood Herron & Evans LLP

(57) ABSTRACT

A cushion for a piece of furniture or a pillow includes a cushion core and an exterior cover at least partially surrounding the cushion core. The cushion core comprises a cushion wrap surrounding a filler, which may be foam or fiber or down or any known filler. The cushion wrap is at least partially made of fabric having a raised surface pattern to increase friction between the cushion core and the exterior cover for holding the cushion core in a desired orientation inside the exterior cover.

20 Claims, 5 Drawing Sheets

CUSHION WITH A NON-SKID FABRIC BORDER

TECHNICAL FIELD

The present invention relates generally to household cushions and, more particularly, to a furniture cushion or a pillow cushion.

BACKGROUND

One of the frustrations with cushions, be they pillow cushions or furniture cushions, is that the cushion core moves relative to the exterior cover of the cushion. This movement may prevent the cushion from being as comfortable as intended.

In the case of a pillow cushion, movement of the interior relative to the outer casing may cause the cushion core to bunch up and disturb a person's sleep. Sleeping on a bunched-up pillow core may result in neck pain or back problems.

Accordingly, there is a need for a cushion for use as a pillow or a furniture cushion with a removable interior core, including a non-skid border which may help keep the removable cushion interior from moving inside the outer cushion cover.

SUMMARY

According to an exemplary embodiment of the invention, a cushion for use in furniture or as a pillow comprises a cushion core and an exterior cover at least partially surrounding the cushion core. In many furniture applications, the exterior cover fully surrounds the cushion core and has a zipper built into the exterior cover.

The cushion core comprises a cushion wrap surrounding a filler. The filler may be feathers, foam or fiber or any combination thereof. The present invention is not intended to in any way limit the filler inside the cushion core. The invention resides in the cushion wrap. In some embodiments, the cushion wrap comprises an upper piece of fabric, a lower piece of fabric and a border piece of fabric sewn to the upper and lower pieces of fabric around a perimeter of the upper and lower pieces of fabric. The border piece of fabric is made of a non-skid fabric to prevent relative movement between the exterior cover and the cushion core. One type of fabric used for the border piece of the cushion wrap has a raised pattern thereon, such as ribs, for example. However, the raised portion of the fabric may be any desired pattern or in a random application, which would not be considered a pattern. In some embodiments, one or both of the upper and lower pieces of fabric may be made of a non-skid fabric in addition to the border piece of fabric. In some embodiments, the border piece of the cushion wrap may be made of conventional fabric having a smooth exterior, and at least one of the upper and lower pieces of fabric being made of a non-skid fabric material.

According to another aspect of the invention, a cushion for use in furniture, or as a pillow, comprises a cushion core and an exterior cover at least partially surrounding the cushion core.

The cushion core comprises a cushion wrap and filler inside the cushion wrap. The cushion wrap comprises a first piece of fabric, a second piece of fabric and a border piece of fabric secured to the first and second pieces of fabric. The border piece of fabric is made of a non-skid fabric material to prevent relative movement between the exterior cover and the cushion core. One type of fabric used for the border piece of the cushion wrap has a raised pattern thereon, such as ribs, for example. However, the raised portion of the fabric may be any desired pattern or, in a random application, which would not be considered a pattern.

The first and second pieces of fabric of the cushion core may be the same size or may be different sizes. Similarly, the first and second pieces of fabric of the cushion core may be made of the same fabric or may be made of different fabrics.

According to another aspect of the invention, a cushion for use in furniture, or as a pillow, comprises a cushion core and an exterior cover, at least partially surrounding the cushion core. The cushion core comprises a cushion wrap and filler inside the cushion wrap. The cushion wrap comprises an upper piece of fabric and a lower piece of fabric. In some embodiments, a border piece of fabric is secured to the upper and lower pieces of fabric therebetween. At least one of the pieces of fabric of the cushion wrap is made of a nonskid fabric material to prevent relative movement between the exterior cover and the cushion core. One type of fabric used for the border piece of the cushion wrap has a raised pattern thereon, such as ribs, for example. However, the raised portion of the fabric may be any desired pattern, or in a random application, which would not be considered a pattern.

One advantage of the cushion of the present invention is that the cushion core does not roll over inside the exterior cover.

Another advantage of the cushion of the present invention is that a cushion core may remain in a desired orientation relative to an exterior cover even when subject to stresses and strains from different directions.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, explain the embodiments of the invention.

DETAILED DESCRIPTION

Figure 1:
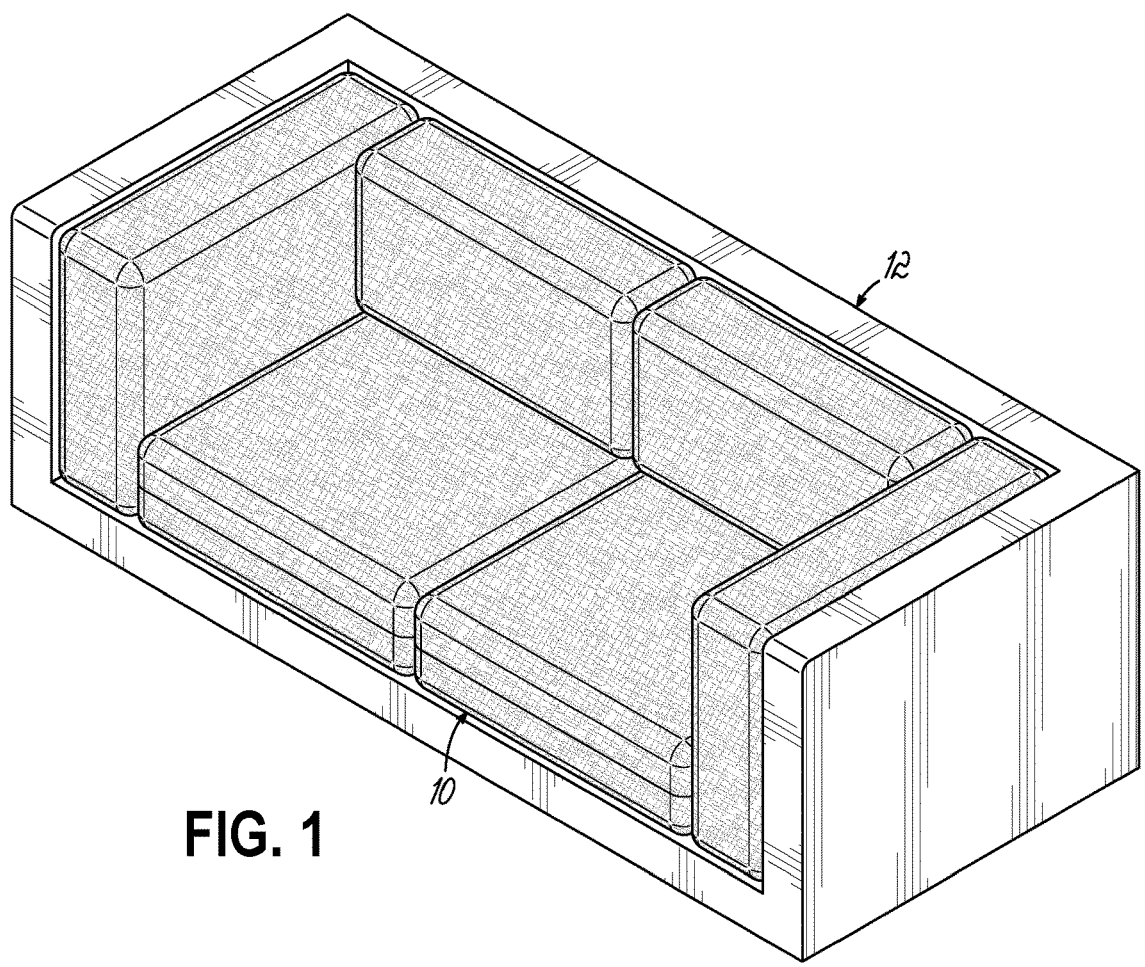
FIG. 1 is a perspective view of a piece of furniture showing a cushion in accordance with the present invention.
Figure 2:
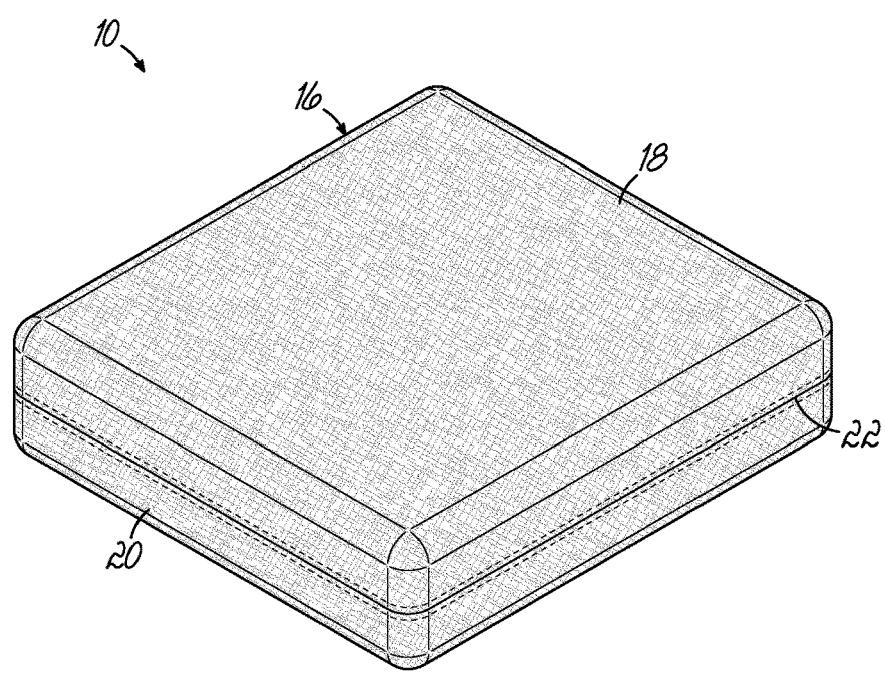
FIG. 2 is a perspective view of one of the cushions of FIG. 1.

Referring to FIG. 1, a cushion 10, according to an exemplary embodiment of the invention, is shown used in a piece of furniture 12. Although the drawings illustrate one type of furniture, a cushion constructed in accordance with the present invention may be used in any piece of furniture. The drawings are not intended to limit the furniture in any way. FIG. 2 shows the cushion 10 outside the piece of furniture 12. Although the cushion 10 is shown being one size, it may be any desired size or shape.

Figure 3:
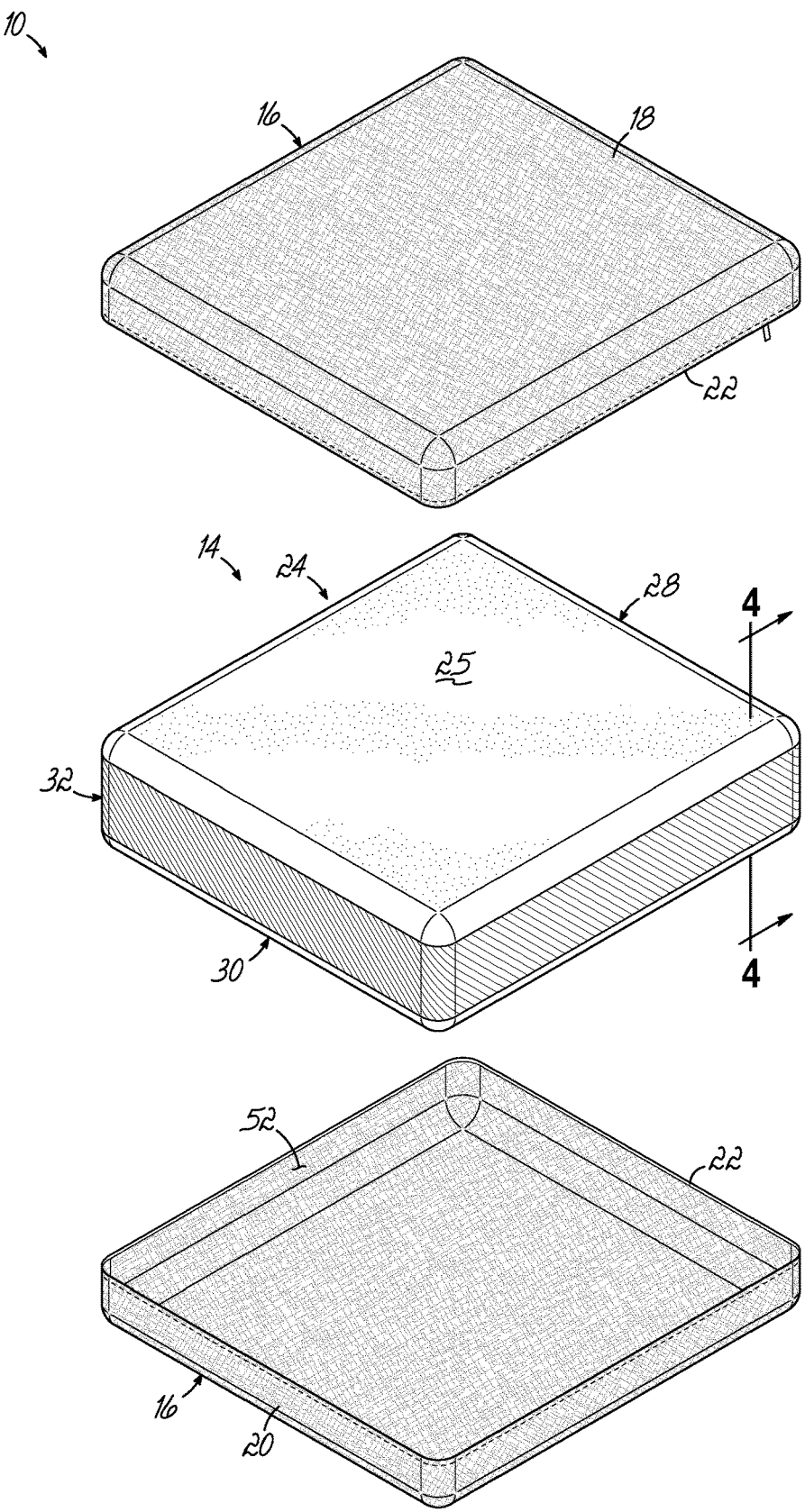
FIG. 3 is a disassembled view showing the cushion of FIG. 1.

Referring to FIG. 3, the cushion 10 comprises a cushion core 14 surrounded with an exterior cover 16. The exterior cover 16 comprises an upper portion 18 and a lower portion 20 joined together with a zipper 22. Although the drawings illustrate the upper and lower portions 18, 20 of the exterior cover 16 being approximately the same size, they may be different sizes. A zipper may be at any desired location. In some applications, a hook and loop fastener, in place of a zipper, may join two or more pieces of fabric of an exterior cover.

Figure 4:
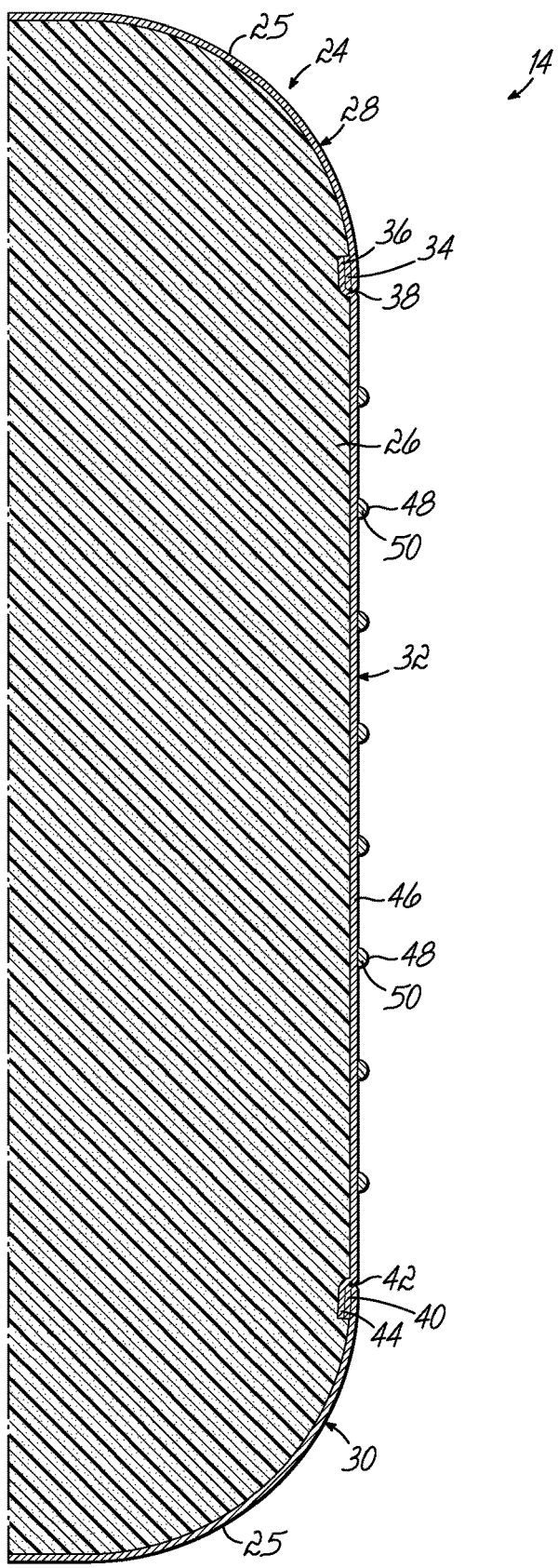
FIG. 4 is a cross-sectional view of the cushion core taken along the line 4-4 of FIG. 3 showing the pieces of fabric.

As best shown in FIGS. 3 and 4, the cushion core 14 comprises a cushion wrap 24 and filler 26 inside the cushion wrap 24. The filler 26 is illustrated being a foam, but may be feathers, fiber, cotton or any known material. The present invention is not intended to limit in any way the filler inside the cushion wrap 24.

The cushion wrap 24 comprises three pieces of fabric: an upper or first piece of fabric 28, a lower or second piece of fabric 30, and a middle or border piece of fabric 32 between the upper or first piece of fabric 28 and the lower or second piece of fabric 30. As best seen in FIG. 4, a perimeter edge 34 of the upper piece of fabric 28 is sewn with stitches 38 to an upper edge 36 of the border piece of fabric 32. Similarly, a perimeter edge 40 of the lower piece of fabric 30 is sewn with stitches 42 to a lower edge 44 of the border piece of fabric 32.

In one embodiment, the first and second pieces of fabric 28, 30 of the cushion wrap 24 are made of the same material, which may be any known fabric material, such as cotton, polyester or a mix thereof. In other embodiments, the first and second pieces of fabric 28, 30 may be made of different materials, which may be any known fabric material, such as cotton, polyester or a mix thereof. In the illustrated embodiment, the first and second pieces of fabric 28, 30 of the cushion wrap 24 have a smooth exterior surface 25.

In the embodiment illustrated in FIGS. 1-4, the middle or border piece of fabric 32 of the cushion wrap 24 is made of a non-skid fabric to prevent relative movement between the cushion core 14 and the exterior cover 16. As best shown in FIG. 4, one type of non-skid fabric has a base portion 46 and a raised pattern 48 extending outwardly from the base portion 46. In the embodiment illustrated, the raised pattern 48 is in the form of spaced, parallel ribs 50. However, the raised pattern may be any pattern. The spaced, parallel ribs 50, or any raised pattern, increases the friction between the raised pattern 48 of the non-skid fabric and the inner surface 52 of the exterior cover 16. This increased friction holds the cushion core 14 in a desired orientation relative to the exterior cover 16 inside thereof. The friction caused by the raised pattern 48 of the non-skid fabric and the inner surface 52 of the exterior cover 16 reduces undesirable movement of the cushion core 14 relative to the exterior cover 16. The middle or border piece of fabric 32 of the cushion wrap 24 may be any known fabric material, such as cotton, polyester or a mix thereof.

Although not shown in the embodiment of FIGS. 1-4, the first or second piece of fabric of a cushion wrap may be made of the same non-skid fabric as the middle or border piece of fabric of the cushion wrap. If desired, the first and second pieces of fabric of a cushion wrap may be made of the same non-skid fabric as the middle or border piece of fabric of the cushion wrap. In some embodiments, the raised patterns on the different pieces of non-skid fabric may differ from one another.

Figure 5:
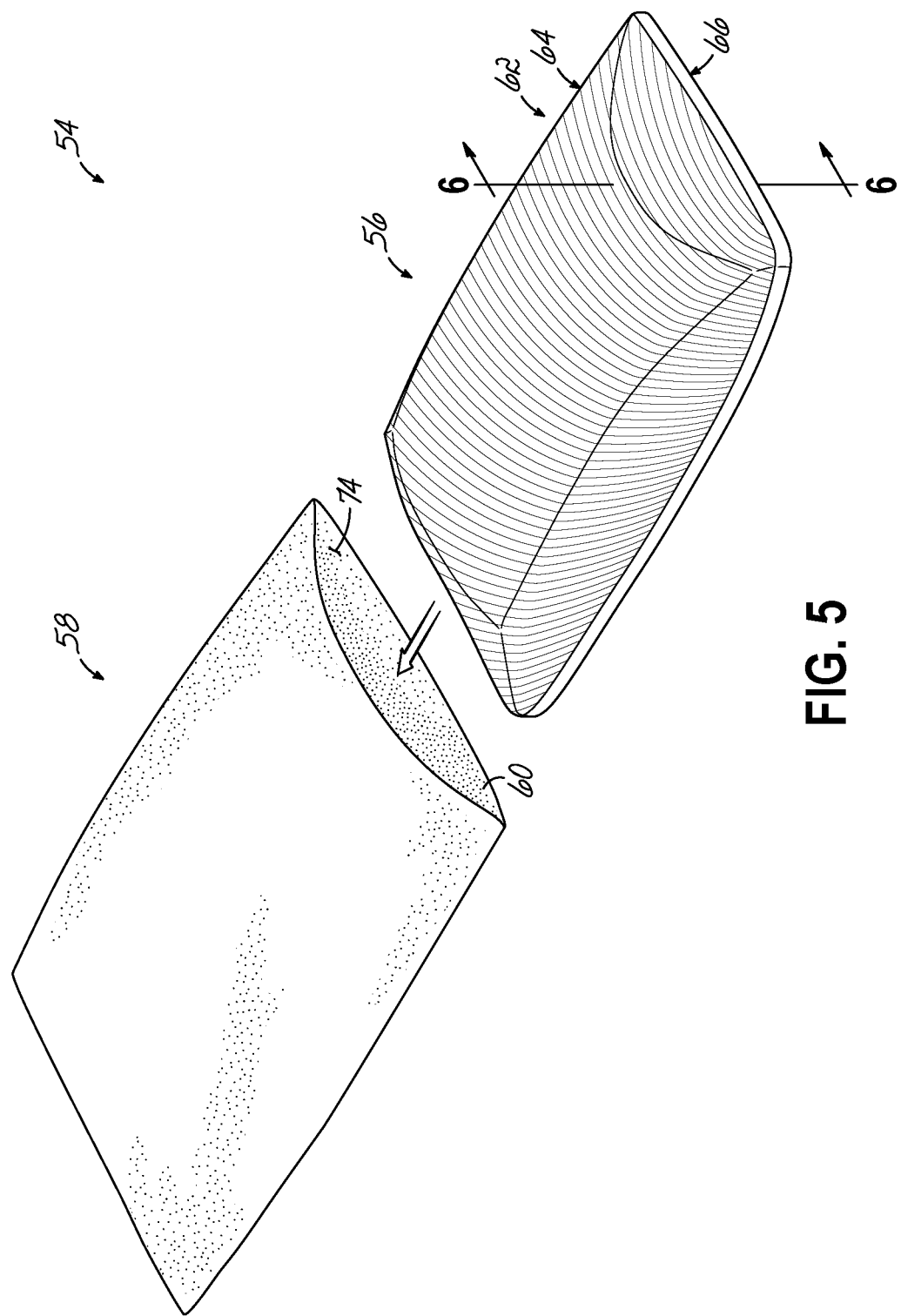
FIG. 5 is a perspective view of another cushion being inserted into a pillowcase.
Figure 6:
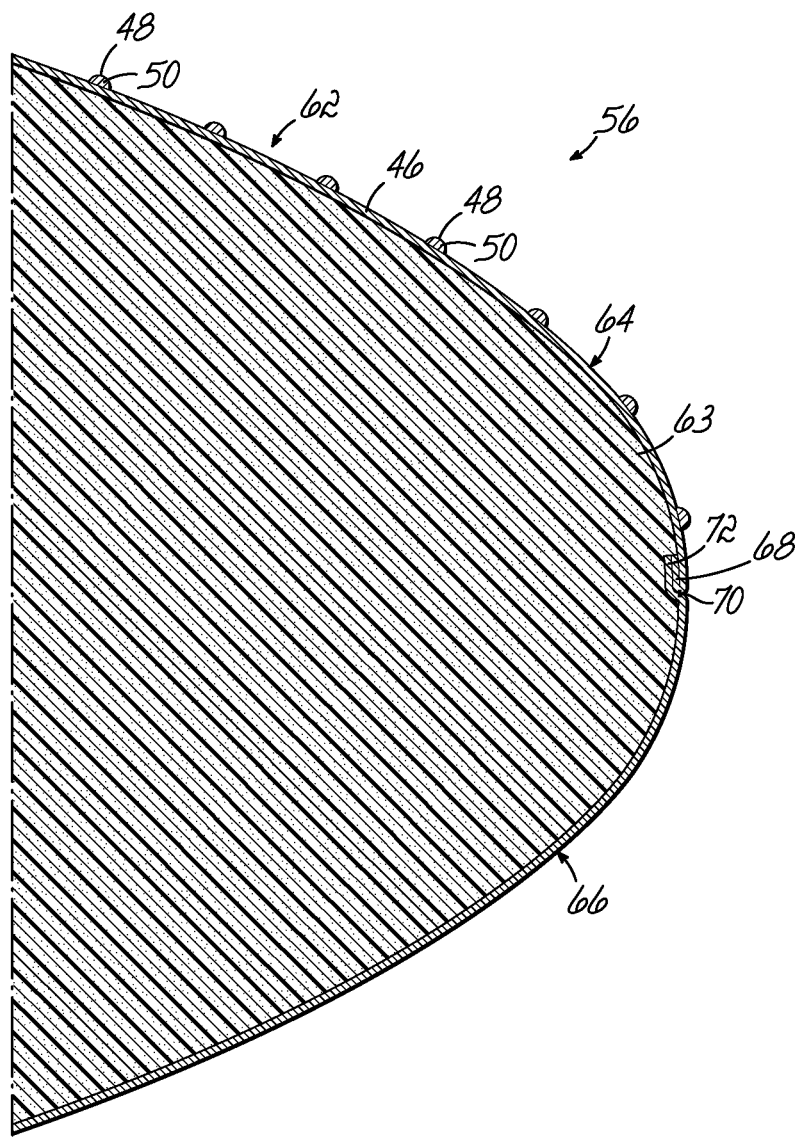
FIG. 6 is a cross-sectional view of the cushion core taken along the line 6-6 of FIG. 5 showing the pieces of fabric.

FIGS. 5 and 6 illustrate a pillow cushion 54 that comprises a pillow cushion core 56 being inserted into a pillowcase or exterior cover 58. The exterior cover 58 has an opening 60 into which the pillow cushion core 56 is inserted.

As best shown in FIGS. 5 and 6, the pillow cushion core 56 comprises a cushion wrap 62 and filler 63 inside the cushion wrap 62. The filler 63 is illustrated being a foam, but may be feathers, fiber, cotton or any known material. The present invention is not intended to limit in any way the filler inside the cushion wrap 62.

The cushion wrap 62 comprises two pieces of fabric: an upper or first piece of fabric 64 and a lower or second piece of fabric 66. As best seen in FIG. 6, a perimeter edge 68 of the upper piece of fabric 64 is sewn with stitches 70 to a perimeter edge 72 of the lower piece of fabric 66.

In the embodiment illustrated in FIGS. 5 and 6, only the upper or first piece of fabric 64 of the cushion wrap 62 is made of a non-skid fabric to prevent relative movement between the pillow cushion core 56 and the exterior cover 58. The lower or second piece of fabric 66 is made of a conventional fabric material. As best shown in FIG. 6, one type of non-skid fabric is the same type shown in FIGS. 1-4, having a base portion 46 and a raised pattern 48 extending outwardly from the base portion 46. In the embodiment illustrated, the raised pattern 48 is in the form of spaced, parallel ribs 50. However, the raised pattern may be any pattern. The spaced, parallel ribs 50, or any raised pattern, increases the friction between the raised pattern 48 of the non-skid fabric and the inner surface 74 of the exterior cover 58. This increased friction holds the pillow cushion core 56 in a desired orientation relative to the exterior cover 58 inside thereof. The friction caused by the raised pattern 48 of the non-skid fabric and the inner surface 74 of the exterior cover 58 reduces undesirable movement of the pillow cushion core 56 relative to the exterior cover 58.

Although not shown in the embodiment of FIGS. 5 and 6, the lower or second piece of fabric of a cushion wrap may be made of the same non-skid fabric as the upper or first piece of fabric of the cushion wrap. If desired, the first and second pieces of fabric of a cushion wrap may be made of the same non-skid fabric. In some embodiments, the raised patterns on the different pieces of non-skid fabric may differ from one another. They need not all have the same pattern. Alternatively, only the lower or second piece of fabric may be made of a non-skid fabric.

Although the embodiment of FIGS. 5 and 6 illustrates the upper and lower pieces of fabric of the cushion wrap 62 being the same size, they may be different sizes.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A cushion comprising:
 a cushion core comprising a cushion wrap and filler inside the cushion wrap, the cushion wrap comprising an upper piece of fabric, a lower piece of fabric and a border piece of fabric sewn to the upper and lower pieces of fabric around a perimeter of the upper and lower pieces of fabric; and an exterior cover surrounding the cushion core, wherein the exterior cover comprises an upper portion and a lower portion joined with a zipper and wherein the border piece of fabric of the cushion wrap is made of a non-skid fabric to prevent relative movement between the exterior cover and the cushion core.

2. The cushion of claim 1, wherein the upper and lower pieces of fabric of the cushion wrap are made of the same fabric.

3. The cushion of claim 1, wherein the border piece of fabric of the cushion wrap has a raised pattern thereon.

4. The cushion of claim 3, wherein the raised pattern comprises ribs.

5. The cushion of claim 1, wherein the upper and lower pieces of fabric of the cushion wrap are the same size.

6. The cushion of claim 1, wherein the border piece of fabric is made of the same fabric as the upper and lower pieces of fabric of the cushion wrap, but with a raised pattern on the fabric.

7. A cushion comprising:

a cushion core comprising a cushion wrap and filler inside the cushion wrap, the cushion wrap comprising a first piece of fabric, a second piece of fabric and a border piece of fabric secured to the first and second pieces of fabric therebetween; and an exterior cover surrounding the cushion core, wherein the exterior cover comprises an upper portion and a lower portion joined with a zipper and wherein the border piece of fabric of the cushion wrap is made of a non-skid fabric to prevent relative movement between the exterior cover and the cushion core.

8. The cushion of claim 7, wherein the first and second pieces of fabric of the cushion wrap are made of the same fabric.

9. The cushion of claim 7, wherein the border piece of fabric of the cushion wrap has a raised pattern thereon.

10. The cushion of claim 9, wherein the raised pattern comprises parallel ribs.

11. The cushion of claim 7, wherein the first and second pieces of fabric of the cushion wrap are the same size.

12. The cushion of claim 7, wherein the border piece of fabric is made of the same fabric as the first and second pieces of fabric of the cushion wrap, but with a raised pattern on the fabric.

13. A cushion comprising:

a cushion core comprising a cushion wrap and filler inside the cushion wrap, the cushion wrap comprising an upper piece of fabric and a lower piece of fabric; and an exterior cover surrounding the cushion core, wherein at least one of the pieces of fabric of the cushion wrap is made of a non-skid fabric having raised ribs to prevent relative movement between the exterior cover and the cushion core.

14. The cushion of claim 13, wherein the upper and lower pieces of fabric of the cushion wrap are made of the same fabric.

15. The cushion of claim 13, further comprising a border piece of fabric secured to the upper and lower pieces of fabric therebetween.

16. The cushion of claim 15, wherein the border piece of fabric of the cushion wrap has a raised pattern thereon.

17. The cushion of claim 16, wherein the raised pattern comprises parallel ribs.

18. The cushion of claim 13, wherein the upper and lower pieces of fabric of the cushion wrap are the same size.

19. The cushion of claim 15, wherein the border piece of fabric is made of the same fabric as the upper and lower pieces of fabric of the cushion wrap, but with a raised pattern on the fabric.

20. The cushion of claim 17, wherein the ribs are spaced apart from each other.

* * * * *